United States Patent
Parigi et al.

[11] Patent Number: 5,216,962
[45] Date of Patent: Jun. 8, 1993

[54] SHEAR FOR SHEARING LAMINAR ELEMENTS

[75] Inventors: Marcello Parigi, Segrate; Pompeo Rovelli, Barzanó, both of Italy

[73] Assignee: FIMI S.p.A. Fabbrica Impianti Macchine Industriali, Italy

[21] Appl. No.: 765,408

[22] Filed: Sep. 25, 1991

Related U.S. Application Data
[63] Continuation of Ser. No. 465,843, Jan. 16, 1990, abandoned.

[51] Int. Cl.$^5$ ............................................. B23D 25/12
[52] U.S. Cl. ..................................... 83/344; 83/345; 83/674
[58] Field of Search ............... 83/343, 344, 345, 332, 83/674, 699

[56] References Cited

U.S. PATENT DOCUMENTS
| | | |
|---|---|---|
| 1,814,513 | 7/1931 | Johnson . |
| 2,756,821 | 7/1956 | Phipps ................................... 83/345 |
| 3,461,767 | 8/1969 | Stubbins ................................. 83/344 |
| 4,112,798 | 9/1978 | Yohizawa et al. ..................... 83/345 |
| 4,226,150 | 10/1980 | Reed ....................................... 83/344 |
| 4,308,776 | 1/1982 | Gillespie et al. ....................... 83/344 |

FOREIGN PATENT DOCUMENTS
| | | | |
|---|---|---|---|
| 934807 | 10/1955 | Fed. Rep. of Germany | ........ 83/344 |
| 2438446 | 2/1976 | Fed. Rep. of Germany | ........ 83/345 |
| 492505 | 5/1968 | Switzerland . | |

Primary Examiner—David Jones
Attorney, Agent, or Firm—Diller, Ramik & Wight

[57] ABSTRACT

The present invention relates to a shear for shearing laminar elements, flat material. This shear comprises at least one pair of blade-holders and associated blades which move substantially parallel to each other along straight lines which are spaced apart a predetermined distance from each other. The predetermined distance is computed as a function of the thickness of the material and the nature of the material which is to be sheared. The blades have cutting edges which, at the time of shearing, apply a pair of mutually perpendicular forces Fx and Fy to the material being sheared. The force Fy acts along a straight line perpendicular to a plane or surface through the material or upon which the material rests. It is along the straight line of the force Fy that the blade-holders and blades move during the shearing operation.

9 Claims, 3 Drawing Sheets

SHEAR FOR SHEARING LAMINAR ELEMENTS

This application is a continuation of application Ser. No. 07/465,843, filed Jan. 16, 1990, now abandoned.

BACKGROUND OF THE INVENTION

The present invention relates to a shear for shearing laminar elements, flat material or the like. This shear comprises at least one pair of blade-holders and associated blades which move substantially parallel to each other along straight lines which are spaced apart a predetermined distance from each other. The predetermined distance is computed as a function of the thickness of the material and the nature of the material which is to be sheared. The blades have cutting edges which, at the time of shearing, apply a pair of mutually perpendicular forces Fx and Fy to the material being sheared. The force Fy acts along a straight line perpendicular to a plane or surface through the material or upon which the material rests. It is along the straight line of the force Fy that the blade-holders and blades move during the shearing operation.

SUMMARY OF THE INVENTION

At present, an extremely wide range of shearing machines are available from the market, which are different from one another according to the structural components thereof.

However, from the standpoint of the shearing action, all of the shears can be substantially subdivided into two types, i.e., shears of the guillotine type, and shears of the rotary type.

The first type of shear, i.e., the guillotine shear, comprises a blade movable on a vertical plane and cooperating, at the shearing line, with a stationary counter-blade.

The second type of shear, i.e., the rotary shear, comprises a pair of blades translating in synchronism along a circular trajectory, so as to cooperate with each other at the shearing line.

In both of the above types of shears, the shearing Action takes place because of the sliding movement of one blade relative to the other blade in two directions substantially parallel to each other and simultaneously perpendicular to the plane on which the material which is to be sheared is supported.

During the shearing, the distance between the straight lines according to which the two blades move relatively to each other should remain as constant as possible, and, in order to attain this result, in prior art shearing machines, the bladeholders are reinforced by means of suitable strengthening elements, so as to counteract the two mutually perpendicular forces $F_x$ and $F_y$. These reinforcing elements effect the maximum value of their moment of inertia in the direction of the relevant force, and their size cause the relevant blade-holders to be particularly large and heavy.

This circumstance creates considerable hindrances to the increase in shearing machines throughput, which is particularly burdensome in case of rotary type shears, and severely jeopardizes the productivity rate of the production lines in which these shearing machines are installed.

In order to obviate this drawback, one could think of replacing the presently installed motor means with other, more powerful, motor means with simultaneously generally strengthening the shearing machine, so as to enable the machine to exceed determined operating speeds.

Such a solution is not recommended, in that a more powerful motor means more weight, and therefore the added power would be most used in order to overcome its own inertial reactions during the acceleration and deceleration steps.

The purpose of the present invention is of providing a shear, in particular of the rotary type, which is capable of obviating the above drawbacks, i.e., is capable of displaying -- at the shearing time -- a higher stiffness of the blade-holders than as offered by the blade-holders of the traditional shears with the mass of said blade-holders being the same, i.e., a shear in which, with the stiffness of the blade-holders -- at the shearing time -- being the same, the mass of said bladeholders is considerably smaller than of the blade-holders the traditional shearing machines are equipped with, thus making it possible the operating speed of the shear, and therefore the throughput of the line in which the shear is possibly installed, to be considerably increased.

Such purposes are achieved by a shear for shearing laminar elements, or the like, of the initially defined type, characterized in that both of said blade-holders are given such a structure, and are so constrained, that they effect the maximum value of their moment of inertia at bending in one direction only, and with said direction being coincident with the direction of the force $F_R$ which is the resultant vector derived from the vector analysis of the forces $F_x$ and $F_y$. In other words, means to be described more fully hereinafter are provided for cooperating with the blade-holders such that the blade-holders, during the shearing of material, establish the maximum value of their moment of inertia at bending in one direction only, and that one direction is coincident with the direction of a resulting force Fr which is the resultant vector of the forces Fx and Fy.

The advantages resulting from the present invention essentially consist in that, inasmuch as said invention makes it possible light, powerful shears to be used, the presently reached productivity limits can be overcome, with considerable benefits for the production line of which the shearing machine possibly constitutes one of the component elements.

The invention is disclosed for merely exemplifying, non-limitative, purposes, by referring to the figures of the hereto attached drawing tables, in which:

DESCRIPTION OF THE PREFERRED EMBODIMENTS

It should be observed here that the figures and the graphic representations of the concerned forces have not been strictly made in scale, in order to improve the understanding of the invention.

Figure 1:
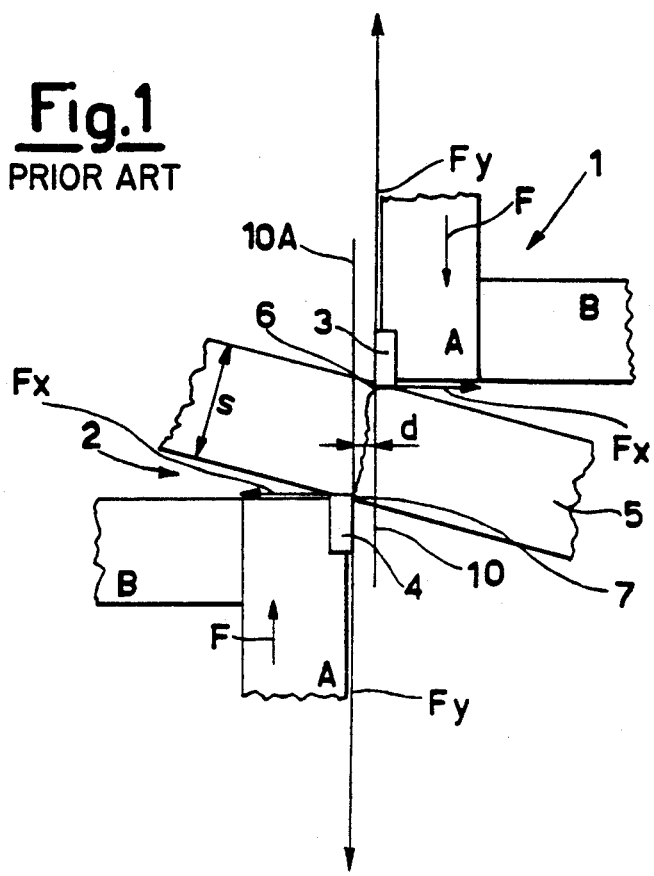
FIG. 1 shows a schematic side view of the cutting elements of a conventional shear.
Figure 2:
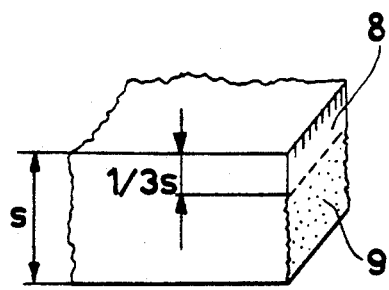
FIG. 2 shows a perspective view of a correctly shorn edge of a metal sheet.

In order to better understand the technical problem solved by the present invention, the dynamics of the shearing action preformed by the traditional shear are illustrated first, with the aid of FIGS. 1 and 2.

The cutting elements of a shear traditionally comprise an upper blade-holder 1 and a lower blade-holder 2, respectively supporting an upper blade 3 and a lower blade 4, suitable for operating, e.g., on a metal sheet 5 of thickness "S". The blades 3 and 4, which usually are of the replaceable type in order to make it possible for them to be rapidly replaced when they are worn out, are respectively provided with straight cutting edges 6 and 7 so lengthwise inclined, as to favour the cutting action. The lengthwise development of the cutting edges 6 and 7 and their inclination along said lengthwise development are not visible in the figures.

During the shearing action the blades 3 and 4, as well as their respective blade-holders 1 and 2 move relatively to each other (arrows "F") along parallel straight lines 10 and 10A, spaced apart from each other by a distance "d" substantially perpendicular to the plane on which the metal sheet 5 is supported.

The distance "d" is preset by those skilled in the art as a function of the thickness "s" of the metal sheet, and is generally a function of said thickness according to the well-known relationship:

$$d = (\text{from } 0.07 \text{ to } 0.10) \cdot s$$

which optimises the shearing action.

The respect of such a distance "d" is essential in order that a correct shearing—i.e., without burrs being formed—, as shown in FIG. 2, may be obtained.

In said FIG. 2, one can substantially see a first, peripheral section 8, of a height substantially equal to ⅓rd of the thickness "s" of the metal plate, in which the cutting took place by plastic deformation of the metal caused by the cutting edges 6 and 7, and a second portion 9, in which the cutting took place by slipping/fracture of the molecular planes, hence without and burrs being formed.

If for the distance between the blades "d" a wrong value is selected, with the thickness of the material to be shorn being not taken into due consideration, negative phenomena occur, which negatively affect the cutting action. Such negative phenomena are not described herein, in that they are well-known to those skilled in the art. It results that it is necessary that during the cutting action said distance "d" should remain as constant as possible along the whole length of the cutting edges 6 and 7, a feature which cannot be achieved if, e.g., a bending occurs of the blades 3 and/or 4 and/or of the blade-holders 1 and/or 2 under the effect of the shearing stresses. In order to obviate such a drawback, in the shears known from the prior art, whether of guillotine or of rotary type, both of the blade-holders are therefore given a particularly reinforced or stiff structure both in the vertical plane, in order to counteract the vertical force $F_y$, and in the horizontal plane, in order to counteract the horizontal force $F_x$.

The vertical force $F_y$ has an extremely high value and therefore tends to deform the blades by causing them to bend on a vertical plane. However, relatively high values of such a bending do not endanger the cutting, because the blades compensate for them by means of their natural downwards movement along a vertical trajectory, according to the direction of the arrow "F". The horizontal force $F_x$ is of a relatively low value, but it tends anyway to deform the blades by causing them to bend in or along a horizontal plane parallel to the plane on which the metal sheets is laid.

However, even relatively small values of such a bending on the horizontal plane irreparably jeopardize the quality of the cut, so that the maximal deformation allowed for the blade-holders in the direction of the force $F_x$ is much smaller than the maximal deformation allowed for the same blade-holders in the direction of the arrow $F_y$. Usually, a bending is allowed in the horizontal plane, the extent of which is 1/10th of the bending extent allowed in the vertical plane.

Therefore, in the shearing machines according to the prior art, each blade-holder has to be equipped with two strengthening or reinforcing structures (indicated by the reference Letters "A" and "B" in FIG. 1), respectively equal for both blade-holders, each of which structures counteracts one of the two forces generated at the shearing time.

The mass of the "A" structure is large, because it has to counteract a considerably large force $F_y$; and the mass of the "B" structure is also large, in that—although it has to counteract a force $F_x$ which is smaller than the force $F_y$—it should reduce to values as small las possible any bending deformations along the whole length of the blade-holder, which is at least equal to the width of the metal sheet to be shorn.

The structural typologies of the "A" and "B" structures may vary according to the type of the shearing machine, and according to the manufacturer thereof; in any case; they should however necessarily share the geometric characteristic of displaying their maximum moment of inertia in the direction of the relevant force.

According to the present state of the art, a good shearing machine is therefore necessarily equipped with large-mass blade-holders, in that the values of their moments of inertia, and therefore of stiffness, should be high along two directions perpendicular to each other.

Figure 4:
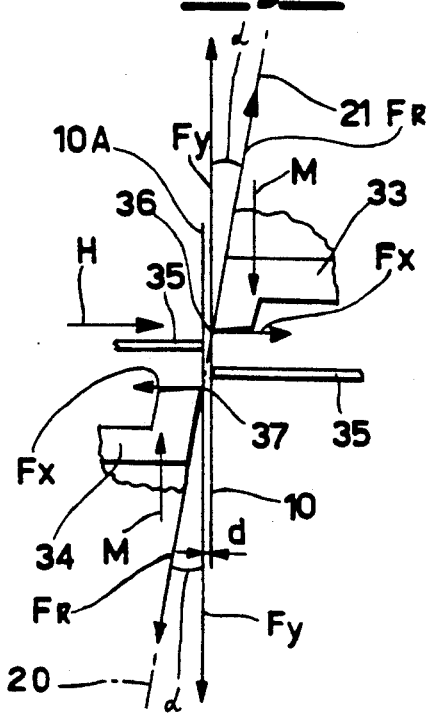
FIG. 4 shows a schematic view of the cutting elements of the shear according to the instant invention.
Figure 3:
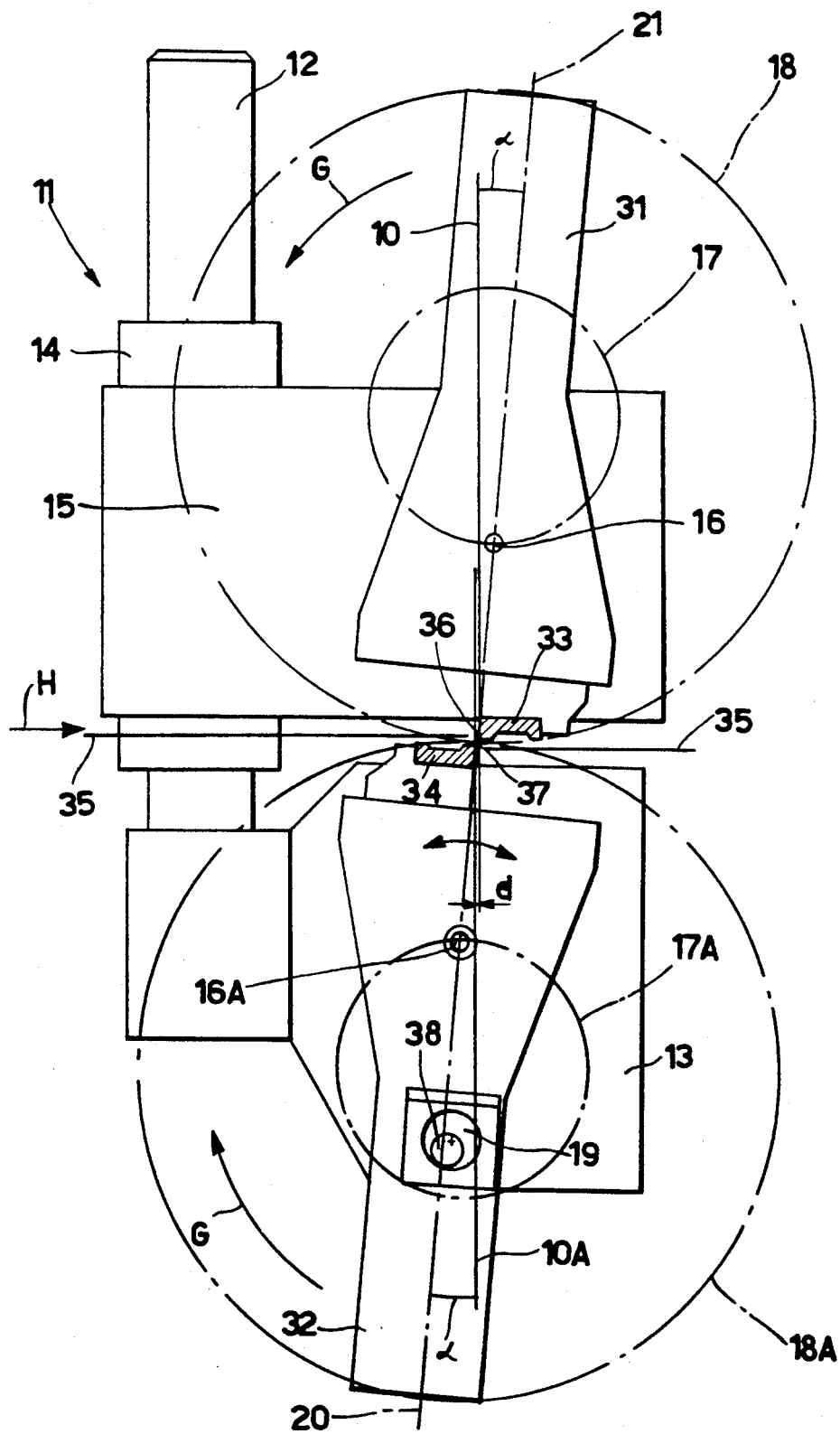
FIG. 3 shows a schematic side view of the shear-holder of a shear of the rotary type accomplished according to the instant invention, shown during the shearing step.

Referring in particular to FIGS. 3 and 4, a shear according to the present invention, generally indicated by the reference numeral 11, is of the type with rotary blades and comprises a guide column 12, an end of which is integrally fastened to a bracket element 13 destined to support a lower blade-holder 32, whose main axis is indicated by the reference numeral 20. On the column 12 a sleeve 14 slides, which makes a part of a bracket element 15 with which an upper blade-holder 31 with main axis 21 is integral. The blade-holders 31 and 32 respectively support an upper blade 33 and a lower blade 34, with cutting edges 36, 37 engaging, during the shearing step, a metal sheet 35 which is being fed in the direction of the arrow "H". The bracket elements 13 and 14 are integral, through crank pins 16 and 16A running along circular trajectories 17 and 17A, with gear wheels 18 and 18A, which gear wheels are each driven by a motor means of its own (not shown in the figures), so as to revolve according to the respective arrow "G".

Said motor means are governed by means of one single microprocessor circuit, and the gear wheels 18 and 18A are in mesh with each other, thus securing their necessary synchronism.

By simultaneously varying the revolution speed of said motor means by a same value, the revolution sped of said blade-holders 31 and 32 is varied. The metal sheet 35 traveling according to a constant-speed rectilinear movement in the direction of the arrow "H" will be consequently shorn into sheets of different lengths.

In the shear 11 according to the present invention, the shearing of the metal sheet 35 is obtained by means of a relative movement (arrows "M") of both of said blade-holders 31 and 32 relatively to each other according to the same mutually parallel straight lines 10 and 10A, spaced apart by the necessary distance "d" and perpendicular to the plane on which the metal sheet 35 is supported.

But both of said blade-holders 31 and 32 are oriented such, that their respective main axes 21 and 20 coincide with each other and with the resultant line of force force $F_R$ is applied, which is the resultant from the vectorial composition of the forces $F_x$ and $F_y$ which are generated at the shearing time.

In such a way, the blade-holders are subject to one single bending stress, due to the resistant force $F_R$, and the resisting or reinforcing section of each blade-holder is provided with a structure such that said blade-holders will present their highest moment of inertia against said single bending stress.

In more concrete terms, such a matter of fact results into the blade-holders 31 and 32 being not equipped with the strengthening structures—inasmuch as such structures are now useless—as indicated by the reference letter "B" in FIG. 1, typical for the blade-holders of the shears according to the prior art; and into said blade-holders being slim and having their own main axis 21 and 20 orientated at an angle α of approximately from 8 to 10 degrees relatively to the straight lines 10 and 10 A perpendicular to the plane on which the metal sheet 35 is laid, it being anyway confirmed that for the purposes of the shearing, the relative positions and movements relatively to the metal sheet 35 of the blades 33, 34 supported by said blade-holders 31 and 32 are identical to those of a traditional shear.

In case of non-metal materials, the angle α may reach values of values of up to 20°. The relative positions and movements of the blades 33, 34 relatively to the sheet 35 remain unchanged in that they are suggested by the prior art in order to fulfil the necessary conditions for the shearing to be correctly executed.

At least one of the blade-holders 31, 32, and in particular the lower blade-holder 32, is associated with means which make it possible the distance "d" existing between the blades 33, 34 to be adjusted by varying the value of the angle α of inclination of the same blade-holder, relatively to the bracket element 13 which supports it.

Such adjustment means comprise an eccentric 38 hinged onto the bracket element 13, motor driven and revolving at the adjustment time, inside a hollow 19 provided on the blade-holder 32.

The possibility of varying the distance "d" is provided in order to make due allowance for the changes in cutting parameters, such as, e.g., the nature of the material, and/or the thickness thereof.

The teachings according to the instant invention are also advantageously applicable to guillotine shears, as well as to rotary shears equipped with share-holders of roll type, as generally indicated by the reference numeral 45.

In case of shears of guillotine type, just inclining by the angle α the mobile blade-holder only, and consistently structurally lightening it, can be enough.

On the contrary, as regards the stationary blade-holder, on considering the absence of forces of inertia, varying the traditional position thereof relatively to the shearing forces, also reducing the mass thereof, is not essential for the purposes of the invention.

Figure 5:
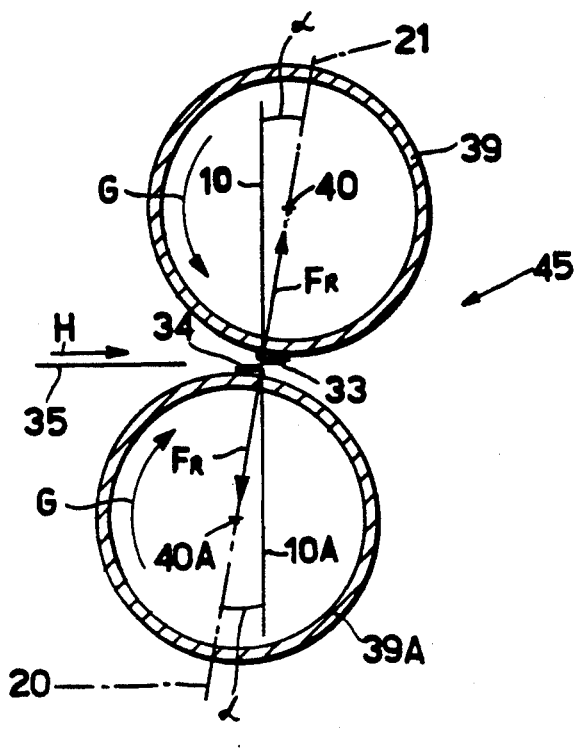
FIG. 5 shows a schematic side view of a rotary shear equipped with blade-holders of roll type, accomplished according to the teachings of the present invention.

In case of rotary shears 45 (reference is made to FIGS. 5 and 6), they use roll blade-holders, respectively indicated by the reference numerals 39 (the upper blade-holder) and 39A (the lower blade-holder), revolving aroung the axes 40 and 40A, as shown in FIG. 5, in which same reference numerals have been used in order to indicate elements corresponding to those as already mentioned.

Figure 6:
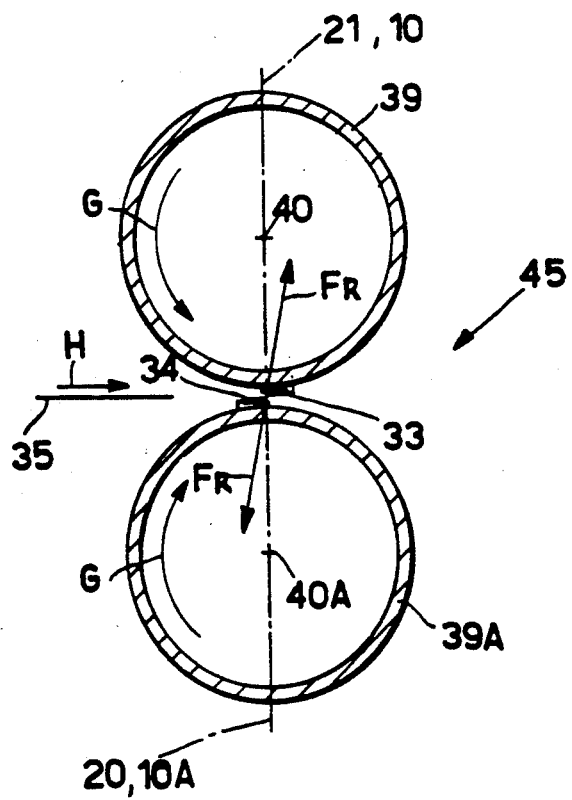
FIG. 6 shows a schematic view of a rotary shear with roll shear-holders of traditional type.

In particular, by comparing FIG. 5, which shows a rotary shear equipped with blade-holders of roll type modified according to the teachings of the present invention, to FIG. 6, showing a rotary shear equipped with traditional blade-holders of roll type as known from the prior art, one can observe that the roll blade-holders of this latter shear are also stressed by a twisting torque $M_t$ having its pole on the axis of revolution 40, 40A of the rolls. This twisting torque deforms the cutting edges on the horizontal plane leading to an increase in said distance "d".

In the shear shown in FIG. 5, on the contrary, said twisting torque $M_t$ is not generated, in that the resultant force $F_R$ deriving from the vectorial composition of the forces $F_x$ and $F_y$ passes through the revolution axes 40, 40A and its direction is the same as of the main axes (20, 21).

We claim:

1. In a shear (11, 45) for shearing material of the type including at least one pair of blade-holders (31, 32 and 39, 39A) carrying blades (33, 34), means mounting said blade-holders and blades for relative movement toward and away from each other in substantially straight parallel lines (10, 10A) spaced apart from each other a distance (d), said blades (33, 34) having cutting edges (36, 37) which apply a pair of mutually perpendicular forces (Fx, Fy) to each of opposite sides of the material which induce bending in said blade holders, a first force (Fy) of the pair of mutually perpendicular forces (Fx, Fy) being directed along the associated straight lines (10, 10A) and substantially normal to a plane upon which the material is supported; the improvement comprising means (16, 16A, 17, 17A, 18, 18A, etc. of FIG. 3 or 40, 40A along 20, 21Fr of FIG. 5 or equivalents thereof) for cooperating with said blade-holders (31, 32 and 39, 39A) such that the blade-holders, during material shearing, establish the maximum value of their moment of inertia during said bending in one direction (20, 21) only; said one direction (20, 21) being coincident with the direction of a resultant force (Fr) which is a resultant vector of the pair of forces (Fx, Fy), and an included angle (α) of inclination being defined between said one direction (20, 21) and the straight lines (10, 10A) in substantially the range of 8 to 10 degrees.

2. In a shear (11, 45) for shearing material of the type including at least one pair of blade-holders (31, 32 and 39, 39A) each carrying a respective blade (33, 34, respectively), means mounting said blade-holders and the blades carried therewith for relative movement toward and away from each other along substantially straight parallel lines (10, 10A) spaced apart from each other and perpendicular to a plane upon which the terminal (35) is supported, said blade-holders (31, 32 and 39, 39A) each having a main axis (21, 20, respectively), said main axes (21, 20) being incident to said straight parallel lines (10, 10A, respectively) to define therewith an angle (α) which remains constant during blade-holder and blade relative movement toward and away form each other, said blades (33, 34) having cutting edges (36, 37) which apply a pair of mutually perpendicular forces (Fx, Fy) to each other on opposite sides of the material and therebetween create a resultant force (Fr) which is the resultant vector of the pair of forces (Fx, Fy), said resultant force (Fr) being substantially coincident with said main axes (21, 20), said blade-holders mounting means being defined by column means along which one of said blade-holders reciprocally slides relative to another of said blade-holders, said blade holders each having a crank pin received in a circular guide of a gear wheel, said gear wheels being in meshed relationship with each other, and means for rotating at least one of said gear wheels to thereby impart said blade-holder and blade movement toward and away from each other.

3. The shear as defined in claim 2 including means for adjustably selectively varying said angle (α).

4. The shear as defined in claim 2 including means for adjustably selectively varying said angle (α), and said angle (α) varying means including eccentric means for altering the position of said last-mentioned blade-holder relative to the remaining blade-holder.

5. The shear as defined in claim 2 wherein said angle (α) is the same relative to each blade main axis and its associated straight parallel line.

6. In a shear (11, 45) for shearing material of the type including at least one pair of blade-holders (31, 32 and 39, 39A) each carrying a respective blade (33, 34, repsectively) means mounting said blade-holders and the blades carried therewith for relative movement toward and away from each other along substantially straight parallel lines (10, 10A) spaced apart from each other and perpendicular to a plane upon which the material (35) is supported, said blade-holders (31, 32 and 39, 39A) each having a main axis (21, 20, respectively), said main axes (21, 20) being incident to said straight parallel lines (10, 10A, respectively) to define therewith in an angle (α) which remains constant during blade-holder and blade relative movement toward and away from each other, said blades (33, 34) having cutting edges (36, 37) which apply a pair of mutually perpendicular forces (Fx, Fy) to each other on opposite sides of the material and therebetween create a resultant force (Fr) which is the resultant vector of the pair of forces (Fx, Fy), said resultant force (Fr) being substantially coincident with said main axes (21, 20), and means for adjustably selectively varying said angle (α).

7. The shear as defined in claim 6 wherein said angle (α) is the same relative to each blade main axis and its associated straight parallel line.

8. In a shear (11, 45) for shearing material of the type including at least one pair of blade-holders (31, 32 and 39, 39A) each carrying a respective blade (33, 34, respectively), means mounting said blade-holders and the blades carried therewith for relative movement toward and away from each other along substantially straight parallel lines (10, 10A) spaced apart from each other and perpendicular to a plane upon which the material (35) is supported, said blade-holders (31, 32 and 39, 39A) each having a main axis (21, 20, respectively), said main axes (21, 20) being incident to said straight parallel lines (10, 10A, respectively) to define therewith an angle (α) which remains constant during blade-holder and blade relative movement toward and away from each other, said blades (33, 34) having cutting edges (36, 37) which apply a pair of mutually perpendicular forces (Fx, Fy) to each other on opposite sides of the material and therebetween create a resultant force (Fr) which is the resultant vector of the pair of forces (Fx, Fy), said resultant force (Fr) being substantially coincident with said main axes (21, 20), means for adjustably selectively varying said angle (α), and said angle (α) varying means including eccentric means for altering the position of said last-mentioned blade-holder relative to the remaining blade-holder.

9. The shear as defined in claim 8 wherein said angle (α) is the same relative to each blade main axes and its associated straight parallel line.

* * * * *